(12) United States Patent  (10) Patent No.: US 9,715,135 B2
Jeong et al.  (45) Date of Patent: Jul. 25, 2017

(54) LIQUID CRYSTAL DISPLAY DEVICE

(71) Applicant: LG Display Co., Ltd., Seoul (KR)

(72) Inventors: Hae-Hyeon Jeong, Gyeongsangbuk-do (KR); Seung-Hoon Yang, Daegu (KR); Won-Tae Kim, Daegu (KR); Min-Woo Kim, Gyeongsangbuk-do (KR); Kwang-Min Lee, Suwon-si (KR); Mi-Ra Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/189,727

(22) Filed: Jun. 22, 2016

(65) Prior Publication Data

US 2016/0306219 A1  Oct. 20, 2016

Related U.S. Application Data

(63) Continuation of application No. 14/451,720, filed on Aug. 5, 2014, now Pat. No. 9,395,568.

(30) Foreign Application Priority Data

Feb. 27, 2014  (KR) .................. 10-2014-0023470

(51) Int. Cl.
 *G02F 1/13* (2006.01)
 *G02B 6/42* (2006.01)
 (Continued)

(52) U.S. Cl.
 CPC .......... *G02F 1/133308* (2013.01); *B32B 7/12* (2013.01); *G02B 6/009* (2013.01);
 (Continued)

(58) Field of Classification Search
 CPC ........ G02F 2001/133311–2001/133334; G02F 2001/133531; G02F 1/133602;
 (Continued)

(56) References Cited

U.S. PATENT DOCUMENTS

2006/0044779 A1 3/2006 Lee
2009/0009684 A1 1/2009 Hsiao
 (Continued)

FOREIGN PATENT DOCUMENTS

CN 102902086 A 1/2013
EP 2551717 A2 1/2013
 (Continued)

OTHER PUBLICATIONS

European Patent Office, Search Report and Opinion, European Patent Application No. 15151878.4, Jul. 6, 2015, eight pages.
 (Continued)

*Primary Examiner* — Mariceli Santiago
(74) *Attorney, Agent, or Firm* — Fenwick & West LLP

(57) ABSTRACT

A liquid crystal display device includes a liquid crystal panel including first and second substrates and a liquid crystal layer between the first and second substrates; a backlight unit under the liquid crystal panel; a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes beyond the bottom frame; a main frame including a first guide portion corresponding to the first edge and a second guide portion corresponding a second edge of the liquid crystal panel opposite to the first edge; and an adhesive covering the side of the liquid crystal panel and an outer side of the third and fourth side surfaces.

10 Claims, 4 Drawing Sheets

(51) Int. Cl.
*G02F 1/1333* (2006.01)
*F21V 8/00* (2006.01)
*G02F 1/1335* (2006.01)
*B32B 7/12* (2006.01)
*G02F 1/1343* (2006.01)
*G02F 1/1362* (2006.01)
*G02F 1/1368* (2006.01)
*G06F 1/16* (2006.01)

(52) U.S. Cl.
CPC ......... *G02B 6/0036* (2013.01); *G02B 6/0051* (2013.01); *G02B 6/0055* (2013.01); *G02B 6/0065* (2013.01); *G02B 6/0068* (2013.01); *G02B 6/0073* (2013.01); *G02B 6/0088* (2013.01); *G02B 6/0091* (2013.01); *G02F 1/1368* (2013.01); *G02F 1/133528* (2013.01); *G02F 1/133615* (2013.01); *G02F 1/134336* (2013.01); *G02F 1/136286* (2013.01); *B32B 2405/00* (2013.01); *G02F 2001/133314* (2013.01); *G02F 2001/133317* (2013.01); *G02F 2001/133322* (2013.01); *G02F 2001/133531* (2013.01); *G02F 2201/08* (2013.01); *G02F 2201/123* (2013.01); *G02F 2201/46* (2013.01); *G02F 2202/28* (2013.01); *G06F 1/1601* (2013.01)

(58) Field of Classification Search
CPC ......... G02F 1/133308; G02F 1/133528; G02F 1/133526
See application file for complete search history.

(56) References Cited

U.S. PATENT DOCUMENTS

| | | | |
|---|---|---|---|
| 2009/0185100 A1* | 7/2009 | Matsuhira | G02B 6/005 349/58 |
| 2009/0310055 A1 | 12/2009 | Kim et al. | |
| 2011/0187692 A1 | 8/2011 | Jung | |
| 2011/0227848 A1 | 9/2011 | Furusawa | |
| 2011/0235364 A1 | 9/2011 | Lo et al. | |
| 2011/0260959 A1 | 10/2011 | Son et al. | |
| 2011/0261283 A1 | 10/2011 | Kim et al. | |
| 2012/0264345 A1 | 10/2012 | Yoon et al. | |
| 2012/0281383 A1 | 11/2012 | Hwang et al. | |
| 2013/0010411 A1 | 1/2013 | Wu et al. | |
| 2013/0027857 A1 | 1/2013 | Jeong | |
| 2013/0236680 A1 | 9/2013 | Ahn et al. | |
| 2014/0043558 A1 | 2/2014 | Hwang et al. | |
| 2014/0204293 A1 | 7/2014 | Kim et al. | |

FOREIGN PATENT DOCUMENTS

| | | |
|---|---|---|
| KR | 10-2013-0032056 A | 4/2013 |
| KR | 10-2013-0073398 A | 7/2013 |

OTHER PUBLICATIONS

Korean Intellectual Property Office, Office Action, Korean Patent Application No. 10-2014-0023470, Jan. 26, 2015, five pages [with concise explanation of relevance in English].
United States Office Action, U.S. Appl. No. 14/451,720, Sep. 16, 2015, seven pages.
State Intellectual Property Office of the People's Republic of China, First Office Action, Chinese Patent Application No. 201510082696.1, May 12, 2017, thirteen pages.

* cited by examiner

LIQUID CRYSTAL DISPLAY DEVICE

CROSS-REFERENCE TO RELATED APPLICATIONS

The present application is a continuation under 35 U.S.C. §120 of U.S. patent application Ser. No. 14/451,720, filed Aug. 5, 2014, which claims the benefit of Korean patent Application No. 10-2014-0023470, filed in Korea on Feb. 27, 2014, both of which are hereby incorporated by reference.

BACKGROUND OF THE INVENTION

1. Field of the Invention

The present invention relates to a liquid crystal display (LCD) device, and more particularly, to a low-weight LCD device having a thin profile and a narrow bezel.

2. Discussion of the Related Art

Display devices represent electrical signals as visual images. Particularly, LCD devices and organic light emitting diode (OLED) display devices are flat panel display devices having characteristics of light weight, thin profile, and low power consumption relative to cathode-ray tube display devices.

Among these devices, since LCD devices display moving images with a high contrast ratio, LCD devices have been widely used.

An LCD device includes a liquid crystal panel. Two substrates with a liquid crystal layer therebetween are attached to form the liquid crystal panel. The alignment of the liquid crystal molecules is changed by an electric field generated in the liquid crystal panel such that images can be displayed by controlling light transmissivity.

Since the liquid crystal panel does not include a light source, the LCD device includes a light source. As a result, a backlight unit including the light source is disposed under the liquid crystal panel.

A main frame surrounds side surfaces of the liquid crystal panel and the backlight unit, and a top frame covers a front edge of the liquid crystal panel. A bottom frame covers a rear surface of the backlight unit. The main frame, the top frame, and the bottom frame are combined for assembly.

Recently, the LCD device has been used as the monitor of desktop computers and portable computers as well as a wall-mounted television. It is beneficial to develop LCD devices having a large display area, low weight, and low volume.

However, the many elements in the LCD device limit the device's lightness and slimness. In addition, the complex assembly process increases assembly time. Large display areas are limited, particularly in narrow-bezel-type LCD devices.

SUMMARY OF THE INVENTION

Accordingly, the present invention is directed to an LCD device that substantially obviates one or more of the problems due to limitations and disadvantages of the related art.

The present invention provides an LCD device having a narrow bezel.

The present invention also provides for more secure assembly of an LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the present invention provides a liquid crystal display device with a liquid crystal panel including first and second substrates and a liquid crystal layer between the first and second substrates; a backlight unit under the liquid crystal panel; a bottom frame including a horizontal surface and first, second, third, and fourth side surfaces, the first side surface corresponding to a first edge of the liquid crystal panel and being opposite to the second side surface, wherein the liquid crystal panel has a size larger than the bottom frame such that a side of the liquid crystal panel protrudes beyond the bottom frame; a main frame including a first guide portion corresponding to the first edge and a second guide portion corresponding a second edge of the liquid crystal panel opposite to the first edge; and an adhesive covering the side of the liquid crystal panel and an outer side of the third and fourth side surfaces.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
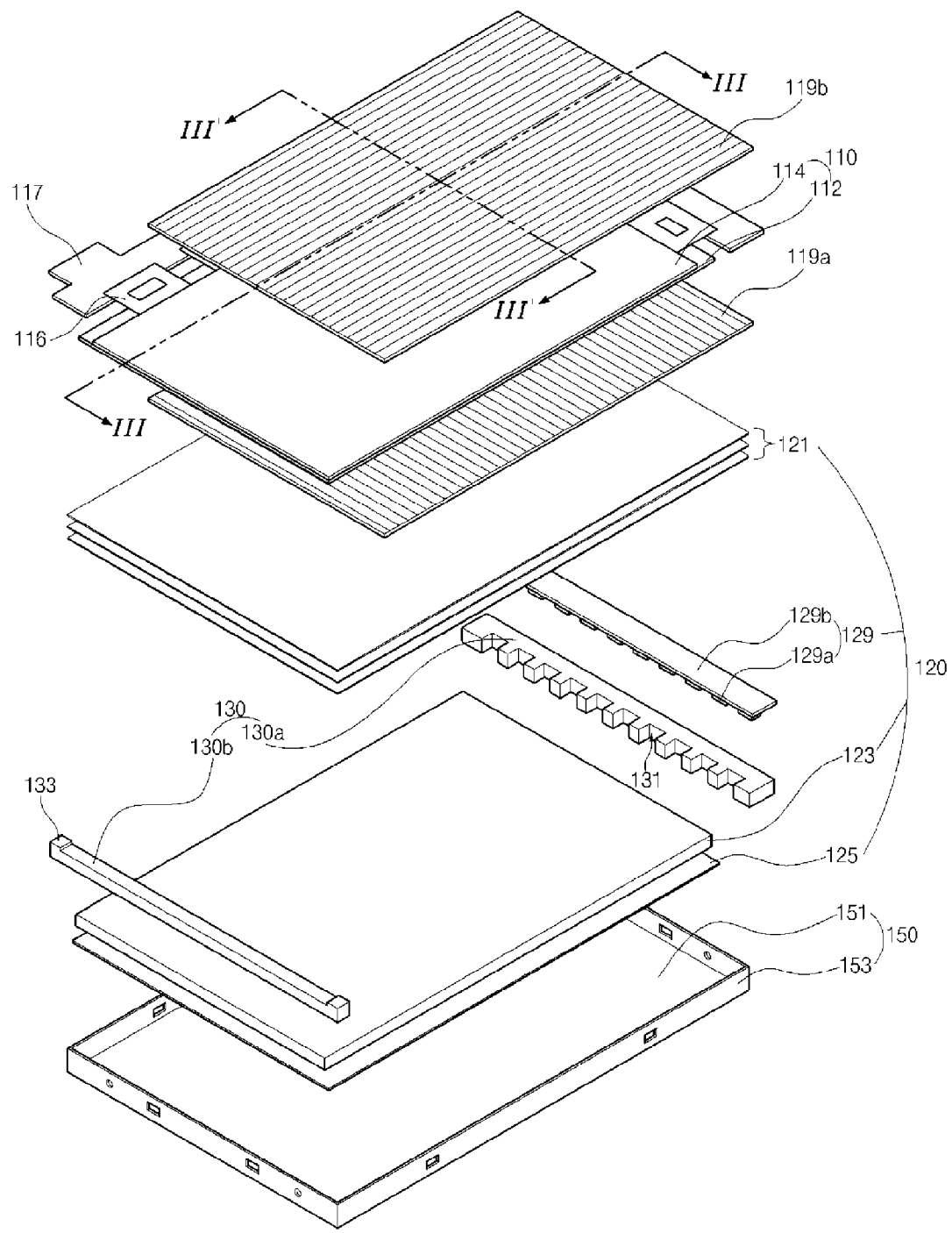
FIG. 1 is an exploded perspective view of an LCD device according to a first embodiment of the present invention.

FIG. 1 is an exploded perspective view of an LCD device according to a first embodiment of the present invention.

As shown in FIG. 1, an LCD device includes a liquid crystal panel 110, a backlight unit 120, a main frame 130, and a bottom frame 150.

The liquid crystal panel 110 includes first and second substrates 112 and 114 facing each other and a liquid crystal layer (not shown) therebetween.

In an active matrix type, array elements, for example, a gate line (not shown), a data line (not shown), a thin film transistor (not shown), and a pixel electrode (not shown), are formed on the first substrate 112. The gate and data lines cross each other to define a pixel region, and the thin film transistor is formed at a crossing point of the gate and data lines. The pixel electrode is disposed in the pixel region and is connected to the thin film transistor.

In addition, a black matrix (not shown) corresponding to the gate line, the data line, and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112.

Moreover, first and second polarizing plates 119a and 119b for selectively transmitting light are positioned on outer sides of the first and second substrates 112 and 114, respectively.

The liquid crystal panel 110 is connected to a printed circuit board (PCB) 117 through a connection member 116, such as a flexible circuit board or a tape carrier package (TCP), and the printed circuit board 117 extends along a side surface of the main frame 130 or a rear surface of the bottom frame 150.

When a thin film transistor is in an ON state (trigged by a scanning signal from the gate driving circuit), an image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using controlled light transmissivity, the backlight unit 120 provides light to the liquid crystal panel 110 and is disposed at a rear side of the liquid crystal panel 110.

The backlight unit 110 includes a light emitting diode (LED) assembly 129 as a light source, a reflective sheet 125 of white or silver color, a light guide plate 123 on the reflective sheet 125 and an optical sheet 121 on or over the light guide plate 123.

The LED assembly 129 is positioned at one side of the light guide plate 123 and includes at least one LED 129a and a printed circuit board (PCB) 129b where the LED 129a is disposed.

A direction of the light from the LEDs 129a is substantially parallel to a surface of the PCB 129b. This may be referred to as a side view type LED assembly.

The LEDs 129a emit red, green and blue color light. The LEDs 129a are simultaneously turned on and off such that white light can be provided from the LEDs 129a by color mixture.

To improve the optical efficiency and the brightness, an LED including a blue LED chip and a yellow fluorescent substance, e.g., cesium-doped yttrium-aluminum-garnet (YAG:Ce), may be used.

The blue light from the blue LED chip is mixed with the yellow light from the yellow fluorescent substance such that the white light is provided.

The light emitted from the LED 129a is incident to the light guide plate 123 and refracted or reflected to be dispersed onto a wide region of the light guide plate 123. The light is processed into a planar light source and provided onto the liquid crystal panel 110.

The light guide plate 123 is formed of a transparent material and has a flat surface. For example, the light guide plate 123 may be formed of an acryl-based plastic material, e.g., polymethylmethacrylate (PMMA), or a polycarbonate-based material.

To provide a uniform plane light source, the light guide plate 123 may include patterns on a rear side surface. For example, the pattern on the rear side surface of the light guide plate 123 is an elliptical pattern, a polygonal pattern, or a hologram pattern.

The reflective sheet 125 is disposed at a rear side of the light guide plate 123. The light passing through a rear side surface of the light guide plate 123 is reflected on the reflective sheet 125 such that light brightness provided into the liquid crystal panel 110 is improved.

The optical sheet 121 includes a plurality of sheets, e.g., a diffusion sheet and at least one light-concentration sheet. The light dispersed through the light guide plate 123 is diffused and/or/concentrated by the optical sheet 121 such that a uniform planar light source can be projected onto the liquid crystal panel 110.

The diffusion sheet is disposed directly over the light guide plate 123 to diffuse the light from the light guide plate 123. The light is directed by the diffusion sheet toward the light-concentration sheet.

The diffused light from the diffusion sheet is concentrated toward the liquid crystal panel 110 by the light-concentration sheet. Most of the light from the light-concentration sheet is substantially perpendicular to the liquid crystal panel 110.

Alternatively, the optical sheet 121 may be a multi-functional optical sheet having both diffusing and light-concentration functions. The optical sheet 121 may have a laminated structure including the diffusion sheet and the light-concentration sheet.

For instance, the multi-functional optical sheet may include a base substrate of a transparent material, a diffusion layer, which is disposed on the base layer, for light diffusion, and a light-concentration layer, which is disposed on the diffusion layer, for light concentration.

The liquid crystal panel 110 and the backlight unit 120 are combined with the main frame 130 and the bottom frame 150 for assembly. The liquid crystal panel 110 and the backlight unit 120 are disposed on and over the bottom frame 150. The bottom frame 150 includes a horizontal surface 151 and a side surface 153 upwardly protruding from edges of the horizontal surface 151. For example, the side surface 153 vertically protrudes. The rear side of the backlight unit 120 is covered by the horizontal surface 151 of the bottom frame 150.

The main frame 130 surrounds side surfaces of the backlight unit 120. The liquid crystal panel 110 is attached and fixed to the main frame 130. The main frame 130 includes a first guide portion 130a and a second guide portion 130b facing and opposite to the first guide portion 130a. The LED assembly 129 is disposed in the first guide portion 130a.

When edges of the liquid crystal panel 110 are defined as first to fourth edges, the LED assembly 129 corresponds to the first edge, and the second edge faces opposite to the first edge. The third and fourth edges are perpendicular to the first and second edges and face each other. The first and second guide portions 130a and 130b are separated from each other and correspond to the first and second edges, respectively. The first and second guide portions 130a and 130b each has a bar shape.

The backlight unit 120 is disposed between the first and second guide portions 130a and 130b, and two opposite side surfaces of the backlight unit 120 are covered by the first and second guide portions 130a and 130b. The liquid crystal panel 110 is attached on and fixed to the first and second guide portions 130a and 130b.

Since there is no main frame along the third and fourth edges of the liquid crystal panel 110, a narrow bezel structure may minimize the non-display area of the LCD device.

Figure 3A:
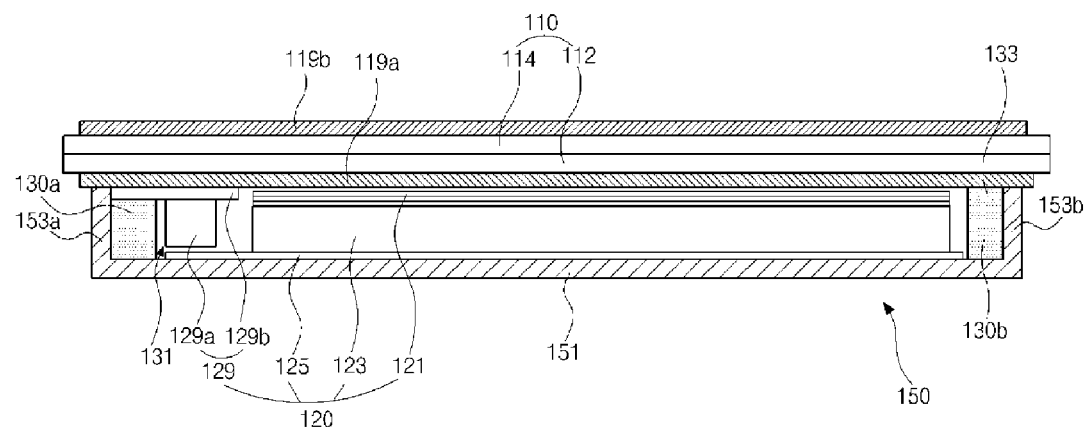
FIGS. 3A and 3B are cross-sectional views along the lines and III'-III' in FIG. 1, respectively.
Figure 3B:
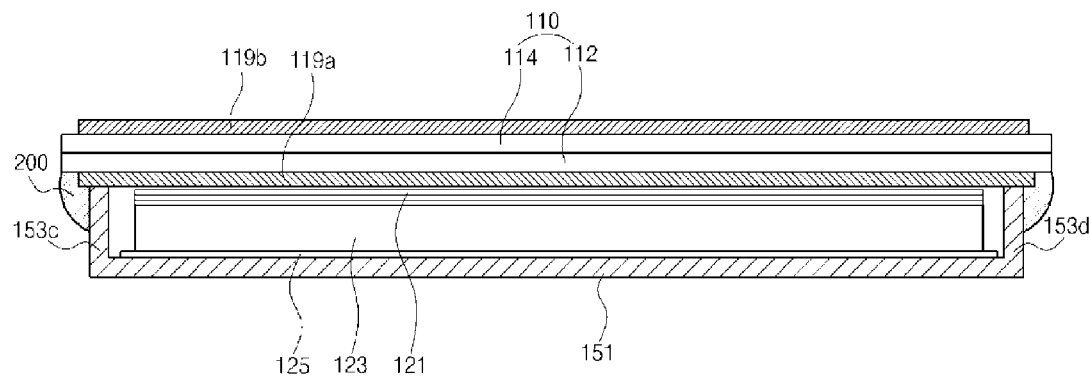

The bottom edge surfaces of the liquid crystal panel 110 in the third and fourth edges are fixed to the side surface 153 of the bottom frame 150 using an adhesive such as glue, as described further with respect to FIG. 3B. Accordingly, the liquid crystal panel 110 is securely assembled with the bottom frame 150 without a main frame along the third and fourth edges.

The main frame 130 may be referred to as a guide panel, a main support, or a mold frame, and the bottom frame 150 may be referred to as a cover bottom, a bottom cover, or a lower cover.

As illustrated above, the LCD device of the present invention does not require a top frame covering front edges of the liquid crystal panel 110, which reduces the thickness and weight of the LCD device and simplifies the assembly process. In addition, the production costs of the LCD device are reduced.

Moreover, the display area of the LCD device is increased and the bezel (which is a non-display area of the LCD device) is decreased by eliminating the top frame. In other words, the LCD device is a narrow bezel LCD device.

The main frame 130 includes separated first and second guide portions 130a and 130b corresponding to the first and second edges of the liquid crystal panel 110 without portions corresponding to the third and fourth edges of the liquid crystal panel 110. As a result, the bezel of the LCD device is further narrowed.

In addition, since the third and fourth edges of the liquid crystal panel 110 are attached and fixed to the side surfaces 153 of the bottom frame 150, the LCD device is securely assembled.

Figure 2:
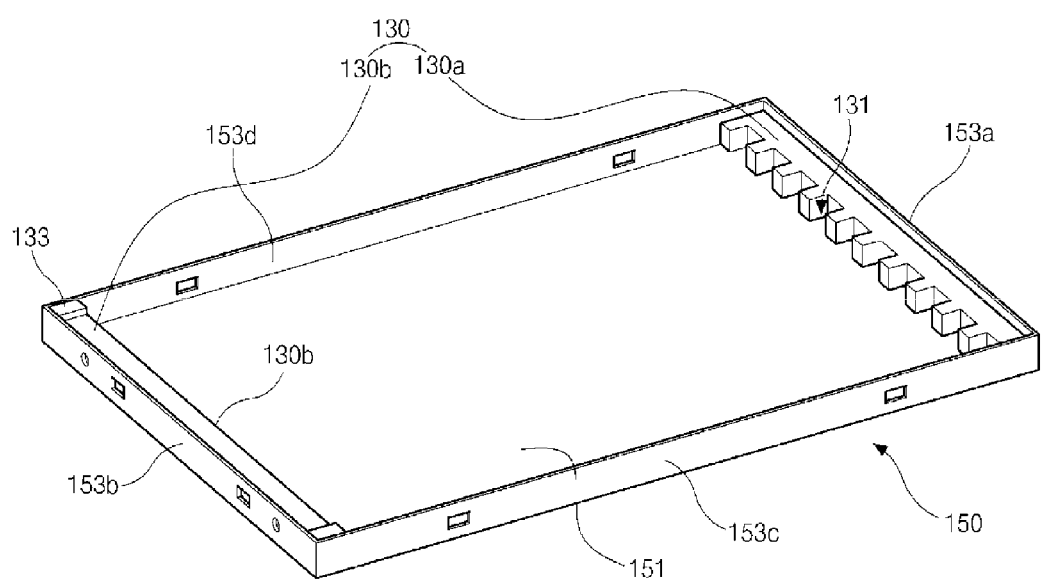
FIG. 2 is a schematic perspective view of a main frame with a bottom frame.

FIG. 2 is a schematic perspective view of a main frame with a bottom frame.

As shown in FIG. 2, the bottom frame 150 includes the horizontal surface 151 and first to fourth side surfaces 153a to 153d vertically protruding from the horizontal surface 151. The first to fourth side surfaces 153a to 153d of the bottom frame 150 correspond to the first to fourth edges of the liquid crystal panel 110, respectively.

The LED assembly 129 (of FIG. 1) is positioned to correspond to the first side surface 153a and the first edge of the liquid crystal panel 110. The first guide portion 130a of the main frame 130 is positioned on an inner side of the first side surface 153a, and the second guide portion 130b of the main frame is positioned on an inner side of the second side surface 153b.

The first guide portion 130a has a length corresponding to a length of the first side surface 153a of the bottom frame 150 and includes an LED guide groove 131 for the LED 129a (of FIG. 1). Each LED 129a is inserted into each LED guide groove 131 such that three sides of the LED 129a are surrounded by the first guide portion 130a. The LED assembly 129 is attached on and fixed to the first guide portion 130a.

Namely, the LED 129 is arranged and mounted on a surface of the PCB 129b (of FIG. 1) and is inserted into the LED groove 131 of the first guide portion 130a. The surface of the PCB 129b, where the LED 129 is arranged, is attached on and fixed to an upper surface of the first guide portion 130a.

As a result, the LED assembly 129 has a fixed position in the LCD device by the first guide portion 130a.

The second guide portion 130b has a length corresponding to a length of the second side surface 153b of the bottom frame 150, and a protrusion 133, which vertically protrudes from an upper surface of the second guide portion 130b, is positioned at both ends of the second guide portion 130b. The liquid crystal panel 110 is disposed on and supported by the protrusion 133. The protrusion 133 has substantially the same thickness as the PCB 129b of the LED assembly 129.

As illustrated above, the LED assembly 129 is attached to the first guide portion 130a by attaching the surface of the PCB 129b, where the LED 129a is arranged, to the upper surface of the first guide portion 130a, and the first edge of the liquid crystal panel 110 is attached to an opposite surface of the PCB 129b and supported by the LED assembly 129. In addition, the second edge of the liquid crystal panel 110 is attached to and supported by the protrusion 133 of the second guide portion 130b. In this instance, the opposite surface (i.e., an upper surface) of the PCB 129b and the protrusion 133 have substantially the same height from the horizontal surface 151 of the bottom frame 150. In addition, the first to fourth side surfaces 153a to 153d of the bottom frame 150 have substantially the same height from the horizontal surface 151 of the bottom frame 150 as the protrusion 133 and the PCB 129b. As a result, the liquid crystal panel 110 is securely attached and fixed to the PCB 129b and the protrusion 133 without an inclination or a gap. In other words, the opposite surface of the PCB 129b and the protrusion 133 form one horizontal plane.

The first and second guide portions 130a and 130b, which are separated from each other and respectively positioned at the first and second side surfaces 153a and 153b of the bottom frame 150, form the main frame 130 without portions at the third and fourth side surfaces 153c and 153c of the bottom frame 150. Accordingly, the non-display region at the third and fourth edges of the liquid crystal panel is minimized to provide a narrow bezel LCD device.

FIGS. 3A and 3B are cross-sectional views along the lines and III'-III' in FIG. 1, respectively, according to a first embodiment of the present invention.

As shown in FIGS. 3A and 3B, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on respective outer sides of the first and second substrates 112 and 114.

The sides of the backlight unit 120 and the liquid crystal panel 110 are surrounded by the main frame 130, which includes the first and second guide portions 130a and 130b, and the bottom frame 150, which covers a rear side of the backlight unit 120 and is attached to the main frame 130.

As shown in FIG. 3A, two opposite sides of the backlight unit 120 are surrounded by the main frame 130, and the LED 129a of the LED assembly 129 is inserted into the guide groove 131 formed in the first guide portion 130a of the main frame 130 such that the light from the LED 129a is incident toward the light guide plate 123. The PCB 129b is attached and fixed to the upper surface of the first guide portion 130a using an adhesive material such as double-faced tape.

The liquid crystal panel 110 is attached to and supported by the PCB 129b, the protrusion 133 of the second guide portion 130b, and an upper surface of each of the first to fourth side surfaces 153a to 153d.

As shown in FIG. 3B, the other two opposite sides of the backlight unit 120 are surrounded by the third and fourth side surfaces 153c and 153d of the bottom frame 150 without the main frame 130. The first side of the light guide plate 123 faces the LED 129a or the first guide portion 130a of the main frame 130, and the second side of the light guide plate 123 faces the second guide portion 130b of the main frame 130. The third and fourth sides of the light guide plate 123 face the third and fourth side surfaces 153c and 153d of the bottom frame 150, respectively.

The liquid crystal panel 110, which is attached and fixed to the PCB 129b, the protrusion 133 of the second guide portion 130b, and the upper surface of each of the first to fourth side surfaces 153a to 153d, has a size larger than the bottom frame 150 such that edges of the liquid crystal panel 110 protrude beyond the bottom frame 150. Namely, the edges of the liquid crystal panel 110 protrude beyond the first to fourth side surfaces 153a to 153d. The rear edges of the liquid crystal panel 110 and an outer side of the side surfaces of the bottom frame 150 are attached by an adhesive 200 such as glue. For example, the adhesive 200 may be formed at the third and fourth side surfaces 153c and 153d but not at the first and second side surfaces 153a and 153b because there is no main frame 130 in the third and fourth side surfaces 153c and 153d.

Since the third and fourth edges of the liquid crystal panel 110 are attached to the third and fourth side surfaces 153c and 153d by the adhesive 200 without the main frame 130, the assembly of the LCD device is secured and the bezel of the LCD device is decreased.

The positioning and/or coverage of the adhesive 200 in the third and fourth edges of the liquid crystal panel 110 are explained with respect to second and third embodiments.

Figure 4:
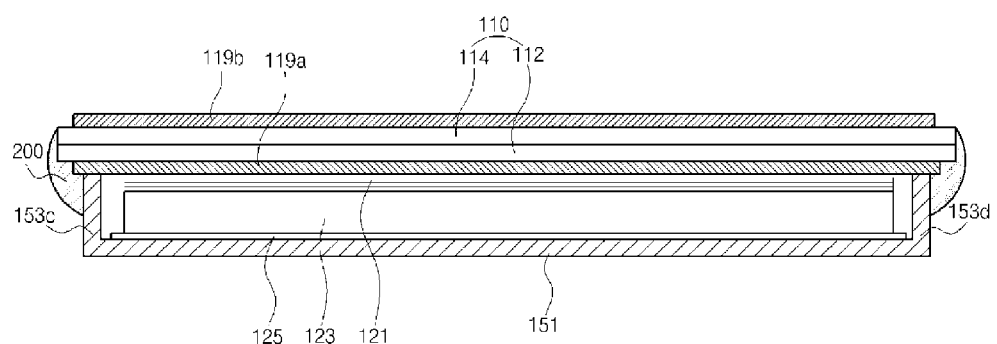
FIG. 4 is a cross-sectional view along the line III'-III' in FIG. 1 of an LCD device according to a second embodiment of the present invention.

FIG. 4 is a cross-sectional view along the line III'-III' in FIG. 1 of an LCD device according to a second embodiment of the present invention.

As shown in FIG. 4, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on outer sides of the first and second substrates 112 and 114.

The sides of the backlight unit 120 and the liquid crystal panel 110 are surrounded by the main frame 130 (of FIG. 2), which includes the first and second guide portions 130a and 130b, and the bottom frame 150, which covers a rear side of the backlight unit 120 and is attached to the main frame 130.

The liquid crystal panel 110 has a size larger than the bottom frame 150 such that edges of the liquid crystal panel 110 protrude beyond the bottom frame 150. The protruding edges of the liquid crystal panel 110 and an outer side of the third and fourth side surfaces 153c and 153d of the bottom frame 150 are attached with an adhesive 200 such as glue. Namely, the protruding edges liquid crystal panel 110 are attached and fixed to the third and fourth side surfaces 153c and 153d of the bottom frame 150 by the adhesive 200.

In the LCD device of the second embodiment, the adhesive 200 covers the side of the liquid crystal panel 110. Namely, the adhesive 200 is formed to cover the side surface of the first and second substrates 112 and 114 of the liquid crystal panel 110, the exposed rear edge of the first substrate 112, the exposed rear edge of the first polarizing plate 119a, the side surface of the first polarizing plate 119a, and the outer side of the third and fourth side surfaces 153c and 153d of the bottom frame 150.

The adhesive 200 has a black color and covers the side surface of the liquid crystal panel 110 such that light leakage from the side surface of the liquid crystal panel 110 is prevented or reduced due to the adhesive 200. Namely, the adhesive 200 is formed of a material that is highly light absorbing.

In addition, since the area of the adhesive 200 in the second embodiment is increased relative to that of the adhesive 200 in the first embodiment (where the adhesive 200 covers the rear edge of the liquid crystal panel 110 except the side surface of the liquid crystal panel 110), the adhesion of the adhesive 200 is improved to more securely attach the liquid crystal panel 110 to the bottom frame 150.

In this instance, the thickness of the adhesive 200 at the side surface of the liquid crystal panel 110 is less than about 0.1 mm such that the resulting increase in the bezel of the LCD device is minimized without light leakage (and while maintaining secure assembly).

Figure 5:
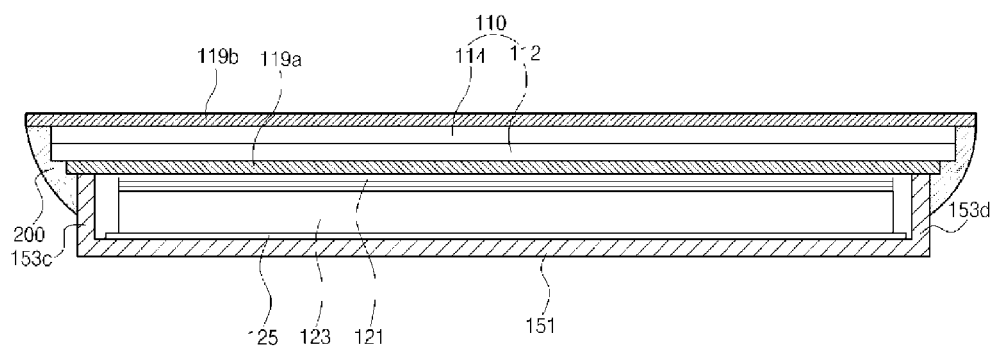
FIG. 5 is a cross-sectional view along the line III'-III' in FIG. 1 of an LCD device according to a third embodiment of the present invention.

FIG. 5 is a cross-sectional view along the line III'-III' in FIG. 1 of an LCD device according to a third embodiment of the present invention.

As shown in FIG. 5, in the LCD device, the reflective sheet 125, the light guide plate 123, the LED assembly 129, which includes the LED 129a and the PCB 129b and is positioned at one side of the light guide plate 123, and the optical sheet 121 on the light guide plate 123 constitute the backlight unit 120. The liquid crystal panel 110, which includes the first and second substrates 112 and 114 and the liquid crystal layer (not shown) therebetween, is disposed over the backlight unit 120. The first and second polarizing plates 119a and 119b for selectively transmitting light are positioned on outer sides of the first and second substrates 112 and 114.

The sides of the backlight unit 120 and the liquid crystal panel 110 are surrounded by the main frame 130 (of FIG. 2), which includes the first and second guide portions 130a and 130b, and the bottom frame 150, which covers a rear side of the backlight unit 120 and is attached to the main frame 130.

The liquid crystal panel 110 has a size larger than the bottom frame 150 such that edges of the liquid crystal panel 110 protrude beyond the bottom frame 150. The protruding edges of the liquid crystal panel 110 and an outer side of the third and fourth side surfaces 153c and 153d of the bottom frame 150 are attached with an adhesive 200 such as glue. Namely, the protruding edges liquid crystal panel 110 are attached and fixed to the third and fourth side surfaces 153c and 153d of the bottom frame 150 by the adhesive 200.

In the LCD device of the third embodiment, the second polarizing plate 119b at an outer side of the second substrate 114 of the liquid crystal panel 110 has a size larger than the liquid crystal panel 110. Namely, a rear edge of the second polarizing plate 119b protrudes beyond the liquid crystal panel 110. In this instance, the sides of the second polarizing plate 119b corresponding to the third and fourth side surfaces 153c and 153d of the bottom frame 150 protrude beyond the liquid crystal panel 110, while the sides of the second polarizing plate 119b corresponding to the first and second side surfaces 153a and 153b of the bottom frame 150 may not protrude beyond the liquid crystal panel 110. Namely, ends of the second polarizing plate 119b corresponding to the first and second side surfaces 153a and 153b of the bottom frame 150 may be positioned in the liquid crystal panel 110. The adhesive 200 covers from the rear edge of the second polarizing plate 119b to the outer side of the third and fourth side surfaces 153c and 153d of the bottom frame 150.

Namely, the adhesive 200 is formed to cover the rear edge of the second polarizing plate 119b, the side surface of the first and second substrates 112 and 114 of the liquid crystal panel 110, the exposed rear edge of the first substrate 112, the exposed rear edge of the first polarizing plate 119a, the side surface of the first polarizing plate 119a, and the outer side of the third and fourth side surfaces 153c and 153d of the bottom frame 150.

The adhesive 200 has a black color and covers the side surface of the liquid crystal panel 110 such that light leakage from the side surface of the liquid crystal panel 110 is prevented or reduced due to the adhesive 200.

In addition, since the area of the adhesive 200 in the third embodiment is increased relative to that of the adhesive 200 in the first embodiment (where the adhesive 200 covers the rear edge of the liquid crystal panel 110 except the side surface of the liquid crystal panel 110), the liquid crystal panel 110 is more securely attached to the bottom frame 150.

Moreover, since the exposed edge of the second polarizing plate 119b serves as a dam in the process of coating a liquid phase material for the adhesive 200, the process efficiency for applying the adhesive 200 is improved.

Furthermore, since the second polarizing plate 119b has the larger size than the liquid crystal panel 110, the end of the second polarizing plate 119b is not positioned in the display area of the liquid crystal panel 110. Namely, the top frame covering front edges of the liquid crystal panel 110 and the front edges of the second polarizing plate 119b is unnecessary. As a result, the LCD device is a clear borderless type LCD device without a border between the image display screen and the frame.

As explained above, since the LCD device of the present invention does not require the top frame, a thin and lightweight LCD device is provided and the assembly process is simplified. Production costs are also reduced.

In addition, without the top frame, the display area is increased and the non-display area is decreased such that a narrow bezel LCD device is provided.

Moreover, the main frame 130 includes separated first and second guide portions 130a and 130b corresponding to the first and second edges of the liquid crystal panel 110 without portions corresponding to the third and fourth edges of the liquid crystal panel 110. As a result, the bezel of the LCD device is further narrowed. The third and fourth edges of the liquid crystal panel 110 without the portions of the main frame 130 are attached and fixed to the third and fourth side surfaces 153c and 153d of the bottom frame 150 by the adhesive 200 for secure assembly of the LCD device.

Furthermore, the adhesive 200 has a black color and covers the side surface of the liquid crystal panel 110 such that light leakage from the side surface of the liquid crystal panel 110 is prevented or reduced due to the adhesive 200. Since the second polarizing plate 119b has a larger size than the liquid crystal panel 110, the process efficiency for applying the adhesive 200 is improved and a clear borderless type LCD device is provided.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a backlight unit;
a liquid crystal panel including first and second substrates, a liquid crystal layer between the first and second substrates;
a first polarizing plate between the first substrate and the backlight unit;
a second polarizing plate on an outer side of the second substrate;
a bottom frame supporting the first polarizing plate; and
an adhesive securing a portion of the bottom frame to an edge of the first polarizing plate and to an edge of the first substrate,
wherein the adhesive has a first height from the portion of the bottom frame, and an upper surface of the second polarizing plate has a second height, which is greater than the first height, from the portion of the bottom frame.

2. The liquid crystal display device according to claim 1, wherein the adhesive secures a lower surface and a side surface of the first polarizing plate to the portion of the bottom frame.

3. The liquid crystal display device according to claim 1, wherein the adhesive secures a lower surface and a side surface of the first substrate to the portion of the bottom frame.

4. The liquid crystal display device according to claim 1, wherein the adhesive further secures a side surface of the second substrate to the portion of the bottom frame.

5. The liquid crystal display device according to claim 1, wherein the adhesive further secures an edge of the second polarizing plate to the portion of the bottom frame.

6. The liquid crystal display device according to claim 1, wherein an end of the second polarizing plate protrudes from the liquid crystal panel, and the adhesive further secures a lower surface of the end of the second polarizing plate to the portion of the bottom frame.

7. A liquid crystal display device, comprising:
a backlight unit;
a liquid crystal panel including first and second substrates, a liquid crystal layer between the first and second substrates;
a first polarizing plate between the first substrate and the backlight unit
a second polarizing plate on an outer side of the second substrate;
a bottom frame supporting the first polarizing plate; and
an adhesive securing a portion of the bottom frame to an edge of the first polarizing plate and to an edge of the first substrate,
wherein a first pair of opposite edges of the second polarizing plate protrude from the liquid crystal panel, and a second pair of opposite edges of the second polarizing plate do not protrude from the liquid crystal panel.

8. The liquid crystal display device according to claim 7, wherein the adhesive covers the first pair of opposite edges of the second polarizing plate and exposes the second pair of opposite edges of the second polarizing plate.

9. A liquid crystal display device, comprising:
a backlight unit
a liquid crystal panel including first and second substrates, a liquid crystal layer between the first and second substrates;
a first polarizing plate between the first substrate and the backlight unit;

a bottom frame supporting the first polarizing plate;

a main frame including first and second guide portions corresponding to a first pair of opposite side surfaces of the bottom frame; and an adhesive securing a portion of the bottom frame to an edge of the first polarizing plate and to an edge of the first substrate, wherein the first pair of opposite side surfaces of the bottom frame face the first and second guide portions of the main frame, and a second pair of opposite side surfaces of the bottom frame directly face a light guide plate of the backlight unit, the second pair of opposite side surfaces including the portion of the bottom frame secured by the adhesive to the edge of the first polarizing plate and to the edge of the first substrate.

10. The liquid crystal display device according to claim 1, wherein the adhesive covers a first side surface of the first polarizing plate and exposes a second side surface of the first polarizing plate.

\* \* \* \* \*